United States Patent [19]

Stetson

[11] 4,347,530
[45] Aug. 31, 1982

[54] SCANNING MIRROR ARRANGEMENT

[75] Inventor: Norman B. Stetson, Lexington, Mass.

[73] Assignee: Inframetrics, Inc., Boston, Mass.

[21] Appl. No.: 200,571

[22] Filed: Oct. 24, 1980

[51] Int. Cl.³ .......................... H04N 7/18; H04N 3/08
[52] U.S. Cl. .................................. 358/113; 250/347; 358/206
[58] Field of Search ............... 358/113, 110, 206, 53, 358/208; 250/347; 350/285, 6.1, 6.5, 6.6, 6.9, 6.91

[56] References Cited

U.S. PATENT DOCUMENTS

| 3,704,342 | 11/1972 | Stoddard | 358/113 |
| 3,816,741 | 6/1974 | Macall | 250/347 |
| 3,978,281 | 8/1976 | Burrer | 358/113 |

Primary Examiner—Howard Britton
Attorney, Agent, or Firm—Cesari & McKenna

[57] ABSTRACT

An image forming scanning mechanism without obturation in its optical path comprises first and second reflectors that are pivotally actuated about respective orthogonal axes. The scanning reflectors are positioned so that radiant energy in a first optical path from an object field impinges upon a vertical-scan reflector where it is directed to a horizontal-scan reflector and whereupon it is directed back onto the vertical-scan reflector from whence it is reflected along a second optical path in a different plane from the first optical path. The pivotal axes of the vertical-scan reflector and the horizontal-scan reflector are perpendicular to path of radiant energy reflected therefrom. A detector is positioned to receive radiant energy from elemental areas of an object field. The orthogonal disposition of the first and second pivotal axes provides a distortion free image signal from the detector that is comparable with the x-y scan pattern of conventional television display circuits.

22 Claims, 9 Drawing Figures

FRONT VIEW

SIDE VIEW

HORIZONTAL SWEEP PATTERN

HORIZONTAL SWEEP PATTERN

SCANNING MIRROR ARRANGEMENT

CROSS-REFERENCE TO RELATED PATENTS

This invention is related to U.S. Pat. No. 3,978,281 issued Aug. 31, 1976 which is assigned to the same assignee hereof, all matter thereof being incorporated herein.

BACKGROUND OF THE INVENTION

This invention pertains to an opto-mechanical scanning system for use in a two-dimensional imaging system, but more specifically, to a raster scanning reflector arrangement of the type including at least two reflectors that are driven to pivot upon axes orthogonal to one another for scanning elemental areas of a field.

In an imaging system which receives or projects radiant energy, an arrangement of reflectors and lenses is used for directing radiant energy from successive elemental areas of a scene to a suitable detector, or for projecting radiant energy from a source thereof to successive positions in a field. Some systems additionally use the reflector arrangement to project radiant energy to a target to illuminate it and thereby enhance the received image of the object.

Typical image enhancing radiation sources that might be used in imaging systems of the above type include coherent laser sources, non-coherent visable light sources, and thermal radiation sources (e.g., ultraviolet through infrared range). Detectors that might be used obviously should possess optical response characteristics that coincide with the wavelengths of the radiant energy being detected. Some of these detectors comprise a vertically aligned linear array of optically sensitive elements that detect radiation levels at successive vertical positions of a real image focused thereon by horizontally sweeping a corresponding object scene. Such a detector might be used in a scanning mirror arrangement having a single horizontal sweep mirror, instead of both a horizontal and a vertical sweep mirror. The vertical field of view in that type of scanning system is limited to the number of optically sensitive elements in the vertical detector array. Another system uses a single focal point detector wherein separator horizontal and vertical sweep reflectors are movable to pass successive elemental portions of a real image over the detector element. These reflectors are electromechanically actuated so that the real image, focused in a plane in which the detector is located, is moved in a raster fashion over the detector element. In this system, the vertical, as well as the horizontal, field of view is limited by the maximum angular displacement of the reflectors.

In a movable reflector mechanism using a single focal point detector element to sweep across the real image, a single gimballed reflector might ideally be used to attain the desired field of view in both vertical and horizontal directions. However, at high scanning frequencies, mechanical difficulties are experienced in the reflector actuating mechanism due to the difficulty in oscillating the relatively large mass of the inner gimbal assembly at correspondingly high frequencies. Therefore, two reflectors are generally used, each one being separately driven to oscillate about respective orthogonal axes.

Focusing of an object scene at the detector may be accomplished by placing an objective lens assembly in the optical path of the system, in which case, planar reflectors are usually used. Focusing can also be accomplished by providing curvature in one or both of the pivoting reflectors to thereby eliminate the need for the objective lens assembly. One disadvantage of using a focusing reflector results from focal plane errors, which increase with increased scan angle. Specifically, when a concave mirror is used as a focusing and scanning element, the points of elemental areas in the object scene mirror pivots about one axis. Thus, if a focal point detector is used to detect the radiation in successive points of a planar image, it will be positioned properly at the focal surface for only one angular position of the mirror. For all other angles the detector will not be on the focal surface, its distance therefrom increasing with the mirror angle. In contrast, when a planar mirror is used to scan the object scene, the focal points lie in a plane. A detector positioned in that plane will therefore retain its proper position relative to the image as the angular position of the lens changes.

Television compatibility is desired for some scanning mechanisms. Compatibility, without the use of expensive scan converters, requires that scanning pattern of the opto-mechanical scanner match the raster scanning pattern of the display circuits of a television video monitor. In a typical television system, horizontal line scanning of the brightness modulated electron beam is usually driven at a relatively high frequency sawtooth waveform, typically at a rate of about 15,750 cycles per second. Vertical scanning of the modulated electron beam is usually performed by a sawtooth waveform at a much lower frequency, typically at a rate near 30 cycles per second. Thus, to be compatible, the vertical and horizontal reflectors of the mechanical scanner must coincide, both in frequency and scanning pattern, with the vertical and horizontal scanning cycle of the television system. An example of a television compatible scanning system is described in U.S. Pat. No. 3,978,281 assigned to the assignee hereof. To achieve high mechanical scanning speeds, a television compatible opto-mechanical scanning system should use reflectors of relatively low mass. The high scanning rates of some high speed scanners impose stringent structural (e.g. stress, strain, and fatigue tolerance) and material (e.g. mass, size, and strength) requirements on the reflector elements and their associated drive mechanisms.

Image distortion presents yet another difficulty experienced in opto-mechanical scanning mechanisms that are interfaced with display monitors. Distortion results from differences between the scan pattern of the reflectors and the scan pattern of the electron beam in the display monitor. A conventional television monitor provides raster scanning in an x-y plane wherein x and y are perpendicular. To eliminate distortion, the scanning pattern of the reflectors in the opto-mechanical scanner should also be perpendicular. Such mechanical scanning would require that the axes of oscillation of the two reflectors be orthogonal. The optical throughput, that is, the quantity of radiant energy transferred through the reflector arrangement, should be as high as possible to lessen sensitivity requirements of the radiant energy detector, or in the case of a projector, to lessen the attenuation of the radiant energy source. Optical throughput can be increased by using larger reflectors and lenses, or by reducing obscuration in the optical path.

From the foregoing, it is quite apparent that several trade-offs among angle of scan (field of view), sensitivity, scan or frame rate, distortion, optical throughput, reflector size, and lens assemblies are considered in the design and construction of two-dimensional raster scanning reflector mechanisms. Other design tradeoffs concommitant with prior art scanners will become apparent upon review of this invention.

U.S. Pat. No. 3,704,342, issued to Stoddard et al on Nov. 28, 1972, describes a high speed infrared scanning mechanism incorporating a two-dimensional raster scanning mirror arrangement. The mechanism includes an objective lens assembly which focuses elemental areas of an object scene upon an infrared detector element. A planar vertical-scan mirror pivots upon a first horizontal axis and a planar horizontal-scan mirror pivots upon a second vertical axis that is orthogonal to the first axis. Resonant torsional oscillators drive the vertical-scan mirror approximately 5% from its nominal position to achieve a 10% vertical sweep at 30 Hz to produce pictorial frames, and drive the horizontal-scan mirror approximately 5% from its nominal position to achieve a 10% horizontal sweep at 3000 Hz to produce line scans within each frame.

In the arrangement of Stoddard et al, a light bundle from each successive elemental area of the object field being scanned first strikes the vertical-scan mirror, secondly strikes the horizontal-scan mirror, and is then focused on the detector by the objective lens assembly. In another embodiment, the light bundle is directed to a detector by a folding mirror.

Another scanning system is disclosed in U.S. Pat. No. 3,997,721 issued to Streifer on Dec. 14, 1976. It describes a method to reduce effective scan angle in a scanner for projecting a beam of light. The particular advantage accorded by Streifer is the reduction of focal plane errors when a proximal planar objective surface is scanned. While the angle of scan for proximal fields is increased, the actual field of view, or scan angle, for distal fields is decreased. The split spectrum field scanner of Streifer requires a plurality of additional reflectors, thus increasing the overall cost of construction, cost of maintenance, and accuracy of the system.

U.S. Pat. No. 3,816,741 issued to Macall describes yet another infrared scanning mechanism comprising a focusing concave vertical-scan mirror and a planar horizontal-scan mirror that pivot upon axes orthogonal to each other. Multiple reflections of radiant energy occur on the planar mirror which include a smaller obscuring reflector in the path of the radiant energy bundle. Multiple reflections increase the effective horizontal sweep angle in the object scene for a given angular sweep of the horizontal mirror. Thus a smaller scan angle for the mirror, which permits higher scan speeds for a given angle of scan, can be used. The smaller obscuring reflector however reduces the optical throughput of the system and thus requires either a more sensitive detector or larger reflectors. Larger reflectors may not be television compatible, for reasons previously indicated. Further, the placement of the smaller obscuring reflector between the vertical-scan and horizontal-scan mirrors prevents the scanning mirrors from being placed in close proximity to each other, and therefore reduces angle of scan attainable for given mirror sizes.

Additional drawbacks and disadvantages of prior art systems will become apparent upon review of the succeeding disclosure.

SUMMARY

In view of the foregoing, an objective of this invention is to provide an opto-mechanical scanning mechanism and method for improving the scanning performance of a two-dimensional raster scanning imaging system.

Another objective of this invention is to provide an opto-mechanical scanning mechanism having maximum optical throughput that scans a relatively larger angle for given reflector sizes.

Another objective of this invention is to provide a distortion free two-dimensional raster scanning mirror arrangement having a high optical throughput and larger angle of scan in the object space that has a comparable number of picture elements per frame as a conventional television raster display device by using planar reflectors of a relatively small mass that are positioned in close proximity to each other and that pivot upon axes that are perpendicular to the axis of the incoming light bundle of the respective reflectors.

Another objective of this invention is to provide greater flexibility in constructing and designing imaging systems having improved detecting capability, frame field size, frame scanning efficiency at higher frame rates, greater optical throughput, and less distortion and obscuration.

Briefly, an opto-mechanical mechanism according to the present invention comprises a vertical-scan reflector that transfers a radiant energy bundle along a first optical path to or from elemental areas of a field, and a horizontal-scan reflector positioned to receive a radiant energy bundle from the vertical-scanning reflector and reflect the radiant energy bundle back onto the vertical-scan reflector at a different angle so that the radiant energy bundle, upon its second incidence on the vertical-scan reflector, is reflected along a second optical path different from the first optical path. The vertical-scan reflector and the horizontal-scan reflector are angularly driven to oscillate upon axes that are substantially orthogonal to each other. The vertical-scan reflector axis is substantially perpendicular to the radiant energy bundle of the first optical path. The horizontal-scan reflector axis is substantially perpendicular to the incident radiant energy bundle from the vertical-scan reflector.

The relative spatial orientation of the first and second scanning reflectors forms an acute angle in the direction of the incoming rays from an objective field and directs outgoing rays to the detector along a path different from the path of the incoming rays. This permits the first and second scanning reflectors to be positioned close together without optically interferring with the separate optical paths. Further, a smaller distance between the detector and foreoptics is attained by placing the scanning reflectors close together. This decreases the size, and costs, of the expensive foreoptic system. The reflector arrangement may be used either to project a radiant energy bundle from a source in the second optical path to a field along the first optical path, or to detect a radiant energy bundle from elemental areas of a field entering from the first optical path by a detector located in the second optical path.

The double reflection on the vertical-scan reflector provides a quadrupling of the vertical sweep angle in the field for a given angular sweep of the vertical-scan reflector. Accordingly, the angle of scan provided by the vertical-scan reflector can be increased while sweeping through a much smaller angle than would otherwise be required. Additional multiple reflections, if desired, on the vertical-scan reflector can provide an even greater vertical field of view by orienting a third stationary reflector in front of the vertical-scan reflector such that the third reflector reflecting plane is substantially parallel to the pivotal axis of the vertical-scan reflector and substantially normal to the pivotal axis of the horizontal-scan reflector. The direction of oscillation of the vertical and horizontal-scan reflectors can be interchanged so that the multiple reflection occurs on the horizontal-scan reflector. The terms "vertical" and "horizontal", as used herein, are relative.

A specific illustrative embodiment of the invention includes an objective lens assembly, radiant energy detector, and a folding reflector for directing radiant energy from the vertical-scan reflector to the detector along the second optical path.

Other advantages, features, and aspects of the invention will become apparent upon review of the succeeding disclosure taken in connection with the accompanying drawings.

DESCRIPTION OF AN ILLUSTRATIVE EMBODIMENT

For the sake of clarity, the operation of the inventive scanning mechanism is described in conjunction with a two-dimensional image forming scanning infrared detector system as illustrated in FIGS. 2 through 5. Such a system, however, can be used in various other image forming devices, such as for example, a system that projects coherent radiation to an image carrying medium. A specific television compatible imaging system in which the mechanism of this invention may be incorporated is described in U.S. Pat. No. 3,978,281. The opto-mechanical scanning mechanism of the present invention can be used in lieu of the scanning mechanism shown in U.S. Pat. No. 3,978,281, the latter being represented in FIG. 1 hereof for purposes of comparison.

As should be apparent, horizontal and vertical directions are relative. The term "vertical", as applied in "vertical-scan reflector", signifies that it is operative to angularly move the vertical-scan reflector about a horizontal axis thereby to scan elemental areas of an object scene in a vertical direction. Each complete vertical scan constitutes a picture frame in a raster scanning operation. The term "horizontal" signifies that the horizontal reflector moves about a horizontal axis thereby to scan elemental areas of the object scene in a horizontal direction. Generally, to achieve television compatibility, the horizontal scan reflector oscillates at a much more rapid rate than the vertical-scan reflector. Furthermore, a "field", as used herein, may comprise either a distal or proximal two- or three-dimensional object scene that is scanned by the scanning mechanism, or a distal or proximal surface or medium which carries a two- or three-dimensional image that is projected by radiant energy from the scanning mechanism.

Figure 1:
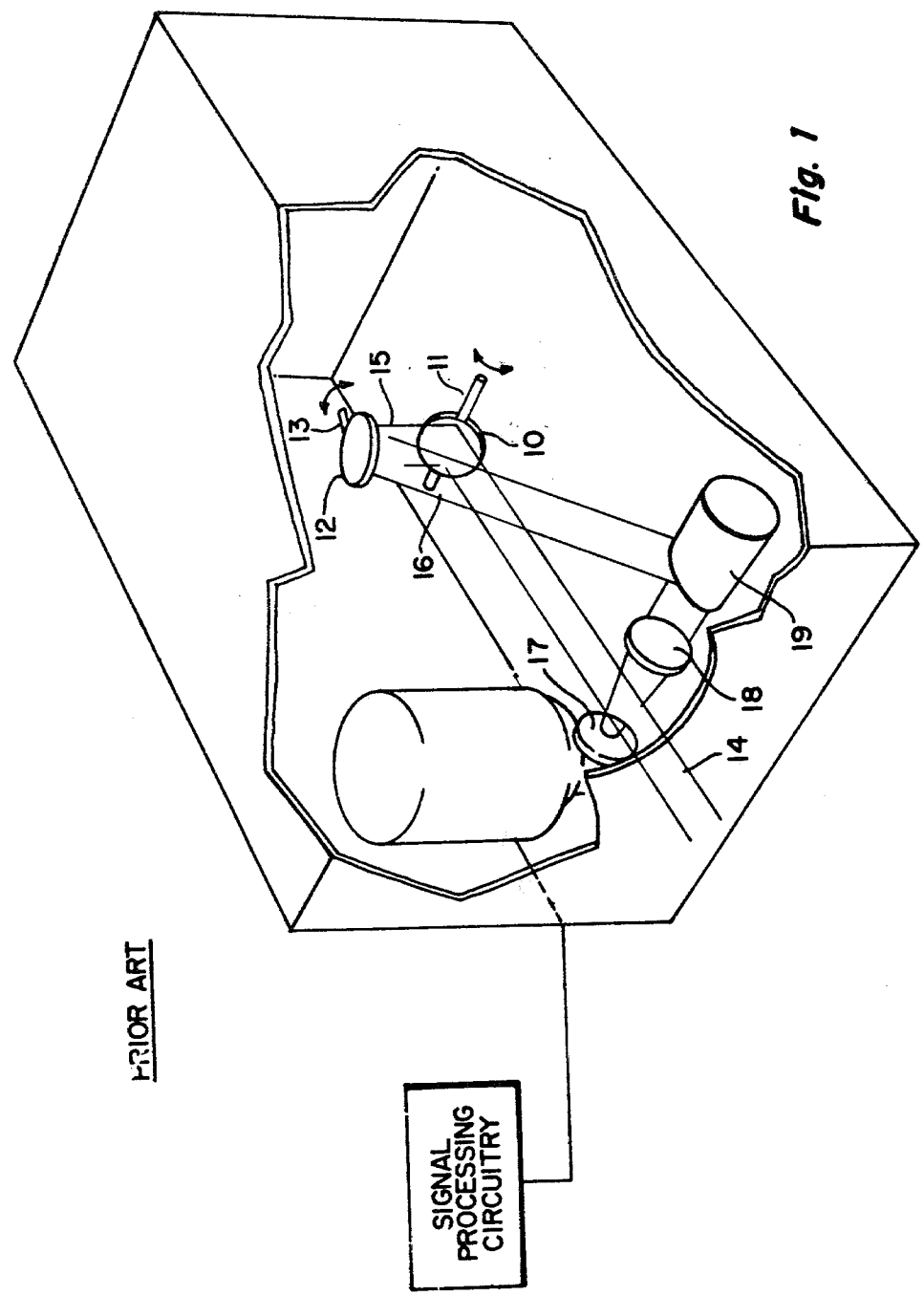
FIG. 1 shows a prior art two-dimensional high speed raster scanning mirror arrangement.

In a prior art scanning mechanism as shown in FIG. 1, reflector 10 oscillates upon an axis 11 to establish a frame scan, while reflector 12 oscillates about its axis 13 to establish line scans. Axes 11 and 13 are orthogonal to each other. A bundle of radiant energy 14 from an object scene first strikes the vertical reflector 10 where it is directed to the horizontal reflector 12 as radiant energy bundle 15. Reflector 12 then directs the received ray bundle 15 along the path of bundle 16 through an objective lens assembly 18 which focuses the bundle 16 on a suitable detector element, such as an infrared detector 17. As the object scene is scanned, successive portions of a real image thereof are swept across the detector 17. The detector 17 produces an electrical signal in response to the instantaneous level of the radiant energy at the successive portions of the real image. The electrical signal is supplied to and processed by signal processing circuitry, such as that described in U.S. Pat. No. 3,978,281, in which, briefly, an intensity modulated video signal is generated by the convention signal processing circuitry by synchronizing the horizontal and vertical sweeps of the video signal with the sinusoidal horizontal and sawtooth vertical sweeps of the reflectors in the scanning mechanism. The level of the brightness modulation signal is proportional to the output electrical signal of detector 17. This permits a visible image corresponding to the infrared radiance of the scanned image to be displayed on the face of the cathode ray tube, which in the illustrative embodiment, may be in the form of a conventional TV monitor.

Figure 6:
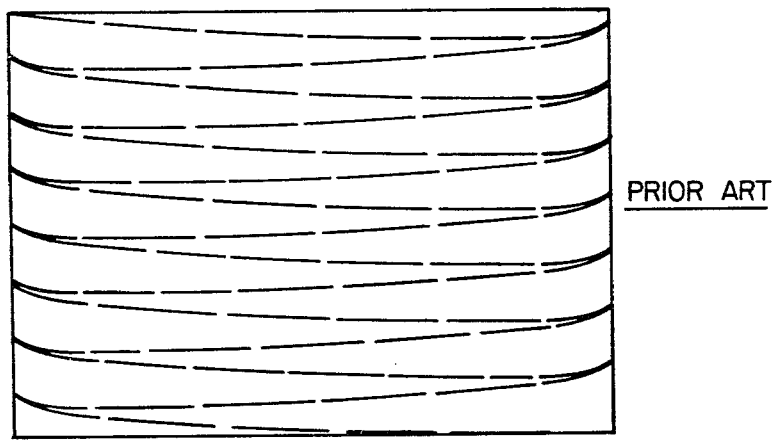
FIG. 6 depicts a curved horizontal scanning pattern produced by a prior art opto-mechanical scanning mechanism having non-orthogonal pivotal axes.

FIG. 1 illustrates generation of a horizontal scanning pattern that traverses the detector element 17. While vertical scan axis 11 of mirror 10 is perpendicular to the path of radiant energy bundle 14, horizontal scan axis 13 of mirror 12 is not perpendicular to the path of radiant energy bundle 15. Thus the distorted horizontal scanning pattern, substantially as shown in FIG. 6, results. The distorted, or curved scanning pattern of FIG. 6, when synchronzied with the linear sweep patterns generated by a television system, produces an undesirable distorted image in the display monitor. Distortion increases with increases in sweep angle.

Moreover, the time period required to produce a complete image of the raster is determined by the frequency of oscillation of the vertical sweep mirror 10. The size of the vertical field is determined by the displacement angle of the vertical sweep mirror 10. The vertical resolution of the imaging system is partially dependent upon the number of line scans performed between successive vertical sweeps. The size of the horizontal field is determined by the angle of the horizontal sweep mirror 12 at maximum displacement. In keeping with one objective of this invention, it is desired to maximize the area of coverage in the vertical objective field by providing multiple reflections on a vertical sweep reflector so that smaller reflector deflection angles yield greater vertical angular sweeps in the object field. To accomplish this objective, I recognized that the scanning mirrors could be brought close together while having the optical bundle perpendicular to the horizontal scan axis and at the same time achieve a double reflection from the vertical mirror. This was accomplished by changing the nominal angle about which one of the mirrors oscillates so as to bring the radiant energy bundle from the object scene along an optical path that is in a plane different from the optical path along which the radiant energy bundle travels in passing to the detector. This contrasts with the scanning mechanism shown in FIG. 1 in which the path of the radiant energy bundle 14 from the object scene, the path of the bundle 15 reflected between the mirrors 10 and 12, and the path of bundle 16 extending to the detector 17 all are in the same plane. In my invention, the path of the radiant energy bundle travels in three dimensions within and to and from the scanning reflectors. In this fashion, two separate non-interfering optical paths are established, one receiving energy from an object scene and the other transferring energy to the detector. The ray bundle 16 is carried to a detector 17 by a third fixed reflector 19 that may be positioned in the optical path 16.

In one embodiment of my invention, I provide two focal point detectors in close proximity to one another so that two lines of the object scene can be simultaneously scanned on a single horizontal sweep of the horizontal-scan reflector. This embodiment is especially advantageous in television compatible opto-mechanical scanning systems in that the information gathered during mechanical scanning approaches the information display capability of conventional television monitors thereby to provide a higher resolution image of the object field, or alternatively, more picture elements. Additional focal point detectors can also be used for even greater resolution or picture elements.

An illustrative embodiment, having a single focal point detector, of an opto-mechanical scanner incorporating the features of the invention is depicted in FIGS. 2 through 5, in which reflectors 21 and 22 angularly pivot about the respective orthogonal axes 24 and 25, while a third non-scanning reflector 23 is disposed in a fixed position. Electro-mechanical actuators 45 and 46 engage shafts 26 and 27 of reflectors 21 and 22, respectively, and angularly move them about their axes 24 and 25 to scan a field in a two-dimensional raster fashion. The scanning operation is subsequently described in more detail. Actuation of the reflectors 21 and 22 may be accomplished electro-mechanically by, for example, torsional vibrators, in which case the reflectors might consist of lightweight beryllium mirrors. Reflecting prisms might also be used in place of the reflectors 21 and 22.

In the preferred embodiment, the vertical-scan actuator 45 actuates the vertical-scan reflector 21 about a nominal angle in a "sawtooth" fashion; that is, vertical sweeps of the object field are performed in one direction. At the end of each vertical sweep, the reflector 21 is rapidly positioned at a starting angular displacement during the "flyback" portion of the sweep, and the actuator 45 then drives the reflector through a subsequent vertical sweep. A typical sweep waveform showing both the sweep portion and the flyback portion is pictorially illustrated in FIG. 5 at the vertical sweep circuit diagram. The duration of the sweep in the vertical in relation to the total duration of sweep and flyback is a measure of the scanning efficiency of the vertical scan reflector 21. I have achieved scanning efficiencies for the vertical-scan of 80% or more. Of course, vertical scanning can be performed in both sweep and flyback directions and thus attain an efficiency of 100%. In this case, actuator 45 may comprise a torsional oscillator.

The preferred horizontal-scan actuator, on the other hand, is a resonant torsional oscillator and scans in left-right and right-left directions to generate information signals at 100% efficiency. The information of alternate line scans are stored, read backwardly, and concatenated with the remaining interlaced line scans prior to being supplied to conventional television circuits which scan in only one horizontal direction. This scanning and signal processing is described in greater detail in the incorporated U.S. Pat. No. 3,978,281.

Other variations of scanning techniques include using resonant oscillators for both vertical and horizontal scans or using a sweep-flyback actuator for both vertical and horizontal scans. The selection of scanning technique would depend upon the nature of application of the opto-mechanical scanning mechanism, such as image projectors or flying spot projectors that are not required to be television compatible.

A bundle of radiant energy 28 from an object scene travels along a first optical path 28 and strikes the vertical-scan reflector 21. As the reflector 21 oscillates (FIG. 2), the axis 28a of ray bundle 28 scans elemental areas of an object scene and for a fixed angular position of reflector 22, remains essentially at a constant angle relative to the axis 24 of the reflector 21. An opening 51 in the housing 50 of the scanning mechanism together with lenses or windows that might be placed in that opening constitutes the area within which radiant energy bundle 28 moves in a raster fashion. An outline of the circular bundle traveling along the axis 28a forms what is characterized as "footprint" 31 on the surface of reflector 21. That same circular bundle is then directed to horizontal-scan reflector 22 along an axis 20 (FIG. 4) and establishes a second footprint 32 on the surface thereof. As the horizontal reflector 22 oscillates, the axis 20 of the ray bundle is always perpendicular to the axis 25 of the horizontal reflector 22. The bundle being reflected at footprint 32 is directed back onto the surface of reflector 21 along an axis 38 (FIG. 3) and forms yet a third skewed, or oblong, footprint 33 thereon. In the embodiment shown, the bundle then is directed from reflector 21 onto the surface of the fixed, or folding, reflector 23, which is angularly positioned so as to ultimately direct the bundle to a detector element 30. A footprint 34 marks the impression of the circular bundle on folding reflector 23 which directs the bundle along a second optical path 29 that lies in a path different from the path of the bundle of the first optical path 28. Optical path 29 may also include an objective lens assembly, depicted in FIG. 3, comprising a single lens or lenses 35, 36 and 37, which focuses the ray bundle onto a detector 30, which may be an array of detector elements, also lying in optical path 29.

Figure 7:
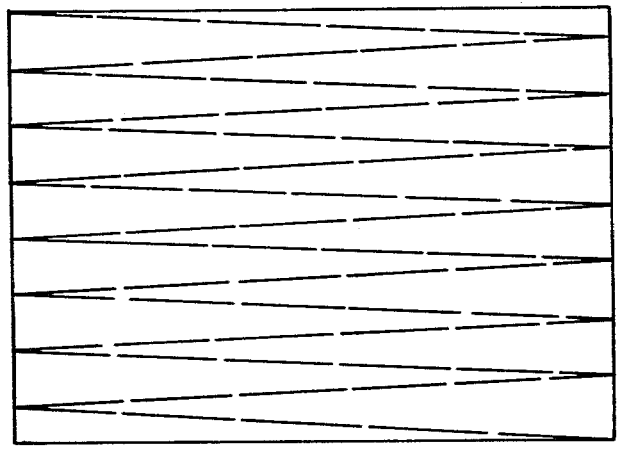
FIG. 7 depicts a non-distorted horizontal scanning pattern having essentially straight horizontal scan lines that is produced by a scanning system incorporating the scanning mirror arrangement of this invention.

In operation, as reflector 22 pivots about its axis 25, footprint 31 moves in a direction parallel to axis 24 of reflector 21, thereby establishing a minimum "horizontal-width" required of reflector 21 in conjunction with the essentially stationary footprint 33. Because the axis of optical paths 28 and 29 lie along different paths, as shown in FIGS. 2 through 5, the axis 25 of the horizontal scan reflector 22 must be positioned so that it does not obstruct the optical bundle 28 as the vertical-scan reflector 21 pivots about its axis 24. To best accommodate this requirement, the nominal angle about which the vertical-scan reflector 21 is disposed should be between 45° and 60° with respect to the optical axis 28a. This permits the reflectors 21 and 22 to be placed close together. Furthermore, axis 25 is perpendicular to axis 20 so as to provide a scanning pattern that is compatible with the scanning pattern of a conventional television display monitor. The scanning pattern of the illustrative opto-mechanical scanner is shown in FIG. 7 which shows a distortion free horizontal scan pattern. The improved distortion free pattern results from arranging the reflector 21 so that the axis 28a of the incoming radiant energy bundle 28 is reflected from surface 21 such that it becomes perpendicular to the axis 25 of the horizontal-scan reflector 22.

Figure 2:
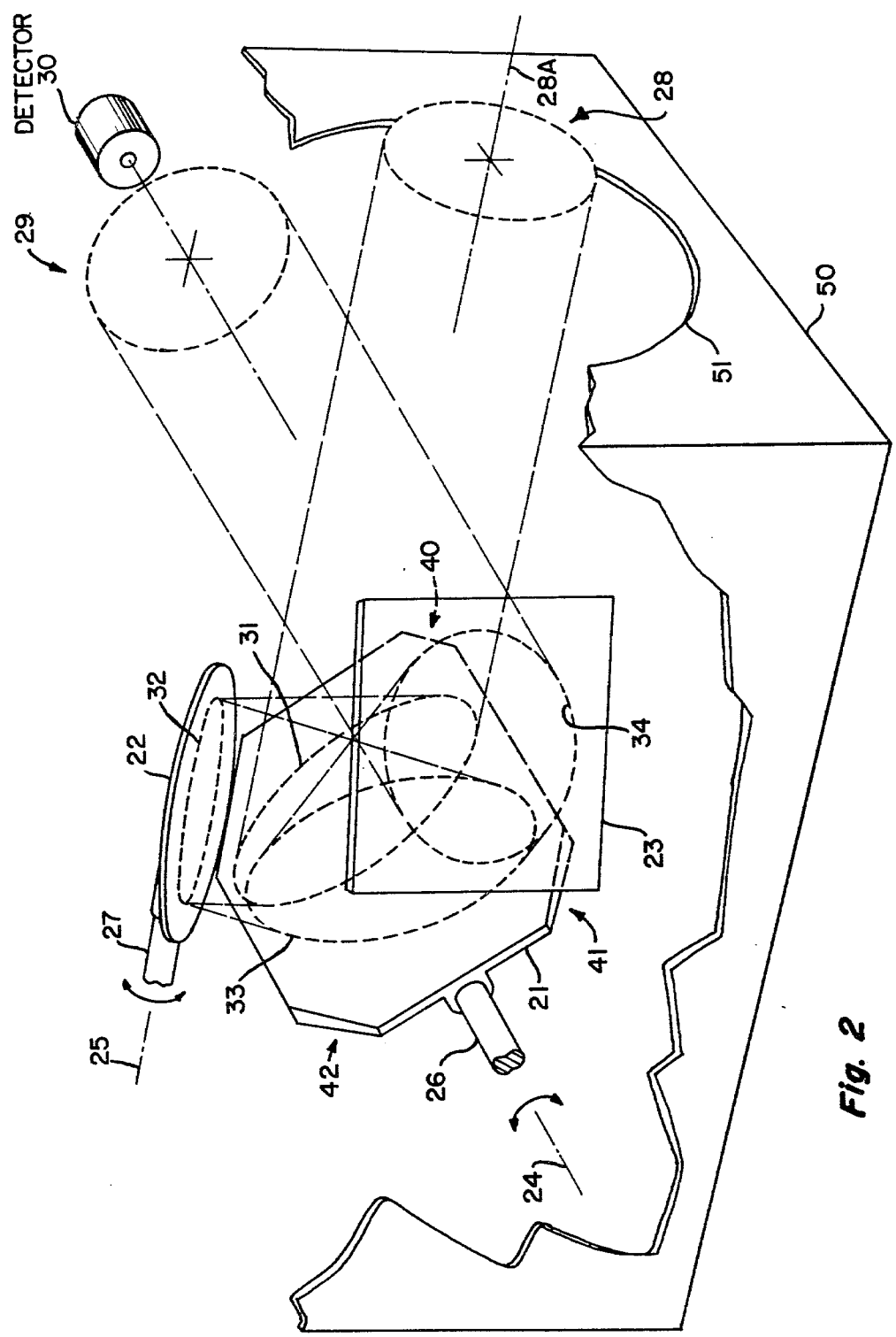
FIG. 2 is a perspective view of an illustrative two-dimensional scanning reflector mechanism according to this invention.
Figure 3:
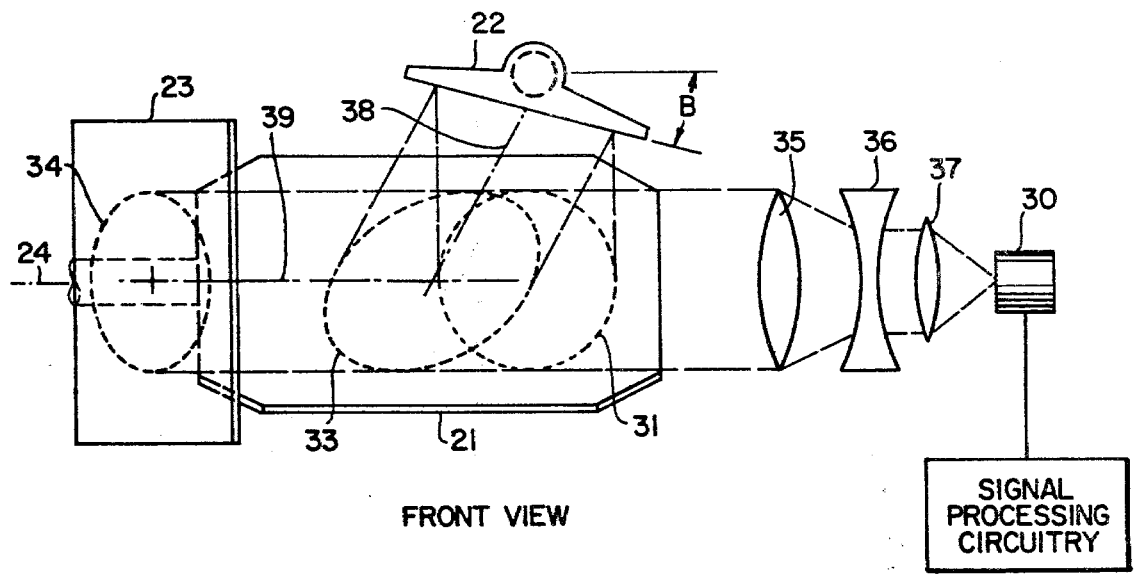
FIG. 3 is a front view of FIG. 2, looking into the optical channel of the scanning mechanism from an object scene.
Figure 4:
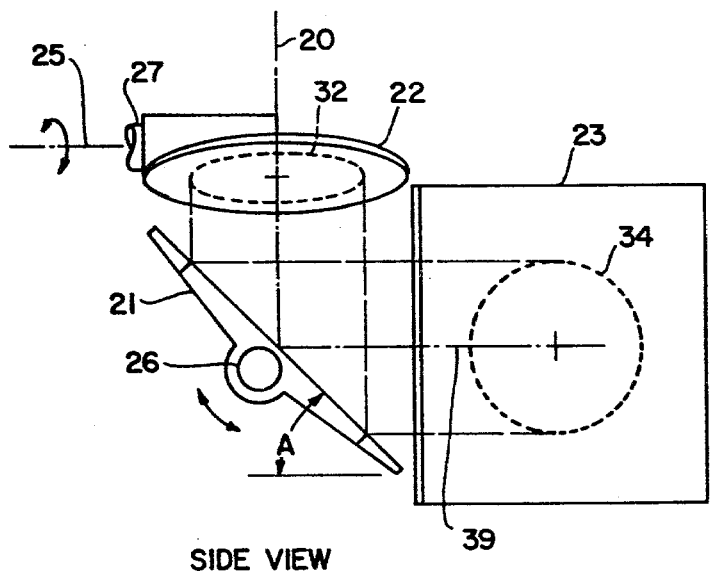
FIG. 4 is a side view of the scanning mechanism of FIG. 2.
Figure 5:
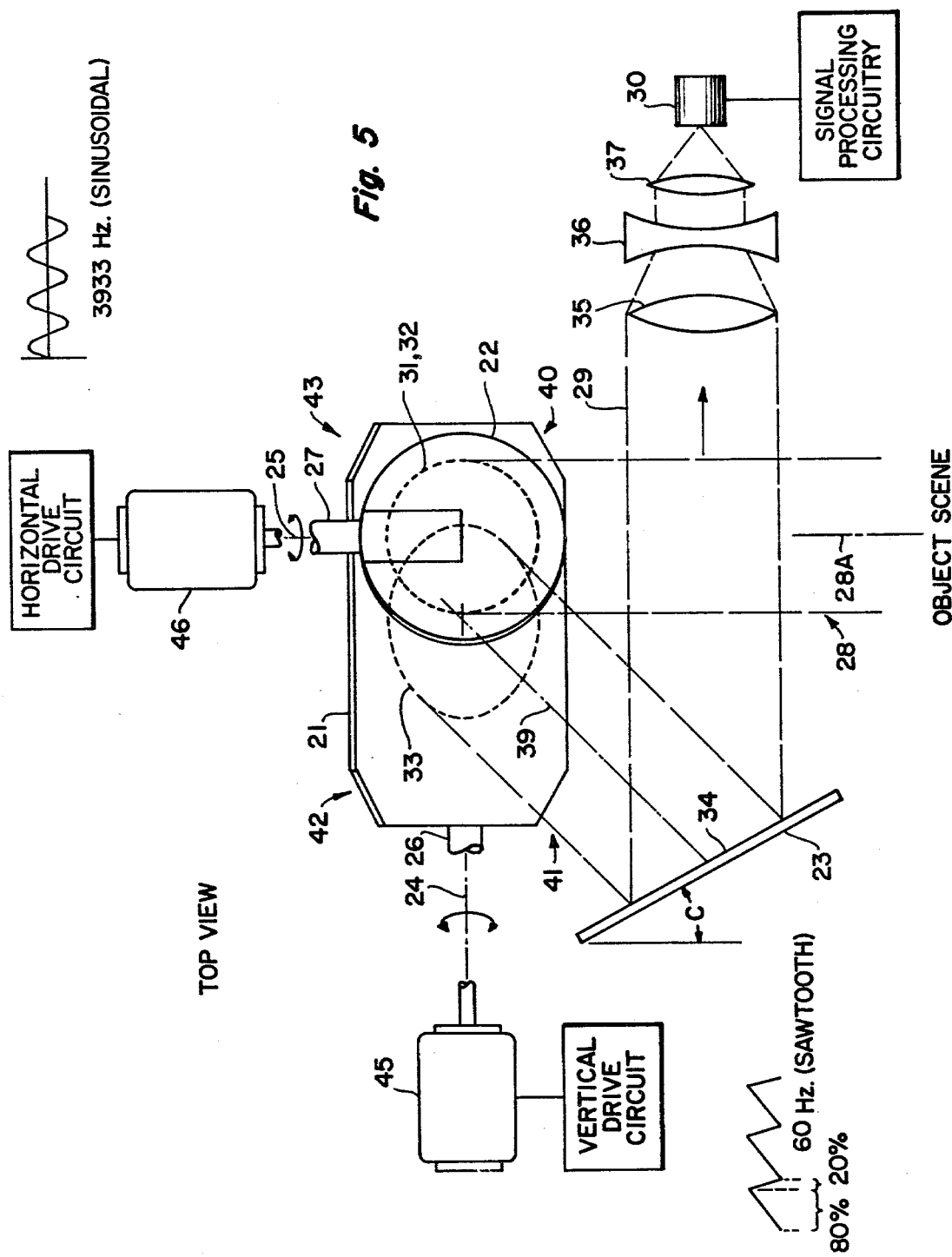
FIG. 5 is a top view of the scanning mechanism of FIG. 2.

Furthermore, the embodiment shown in FIGS. 2 through 5 may provide an even smaller reflector mass and a consequent smaller minimum distance and greater scan angle by mapping the footprints for all possible angles of the reflectors 21 and 22 for a given scan area, and then truncating or shaping the external dimensions of the vertical scan reflector 21 to cover the area of the footprint mappings. Specifically, a corner 43 of reflector 21 (FIG. 2) which does not receive the footprint pattern may be removed so that the reflecting surface of reflector 21 may be positioned closer to that of the reflector 22 without optical or mechanical interference. To minimize the mass of reflector 21, other portions of the vertical reflector 21 may also be removed in accordance with the footprint patterns, as indicated by the other truncated corners 40, 41 and 42 of the reflector 21 (FIG. 2).

The instantaneous level of radiant energy detected by the detector 30 represents the radiation level of the position in the object field defined by the instantaneous vertical and horizontal positions of the reflectors 21 and 22. In a specific illustrative embodiment of the scanning mechanism of FIGS. 2 through 5, reflector 21 is actuated to oscillate through angles of approximately ±2.6° about a nominal angle "A" (FIG. 4) of 45° with respect to the horizontal to produce a 21° vertical field of view. Reflector 22 is actuated to oscillate through cycles of approximately ±7° about its nominal angle "B" (FIG. 3) of 18° with respect to the horizontal to produce a 28° horizontal field of view. Reflector 23 is positioned at an angle "C" (FIG. 5) of 27° with respect to a vertical plane.

A two-dimensional undistorted raster scanning pattern having essentially straight horizontal scan lines as depicted in FIG. 7 is attained by placing axes 24 and 25 orthogonal to one another, although it is not necessary that they be so positioned to scan a two-dimensional area. Further, the objective lens assembly comprising lenses 35, 36 and 37 need not be placed in the optical path 29, but may, in practice, be located at any location within the continued optical path beginning with path 28 and ending with path 29. Further, folding reflector 23 folds the light bundle prior to incidence on the detector 30. Different positions and orientations of the detector 30, reflector 21, reflector 22 would obviously require a different position and angle of orientation of folding reflector 23. It is also possible to eliminate the folding mirror 23 altogether and to place an objective lens system and detector directly in an optical path aligned with footprints 33 and 34, in which case, the invention may be practiced with only two reflectors, namely reflectors 21 and 22. Further, parabolic reflectors can be substituted for planar reflectors 21 and 22 to obviate the need for objective lens assembly without departing from the scope of the invention, but of course focal plane errors might result. For small scan angles, slight errors can be tolerated.

Figure 8:
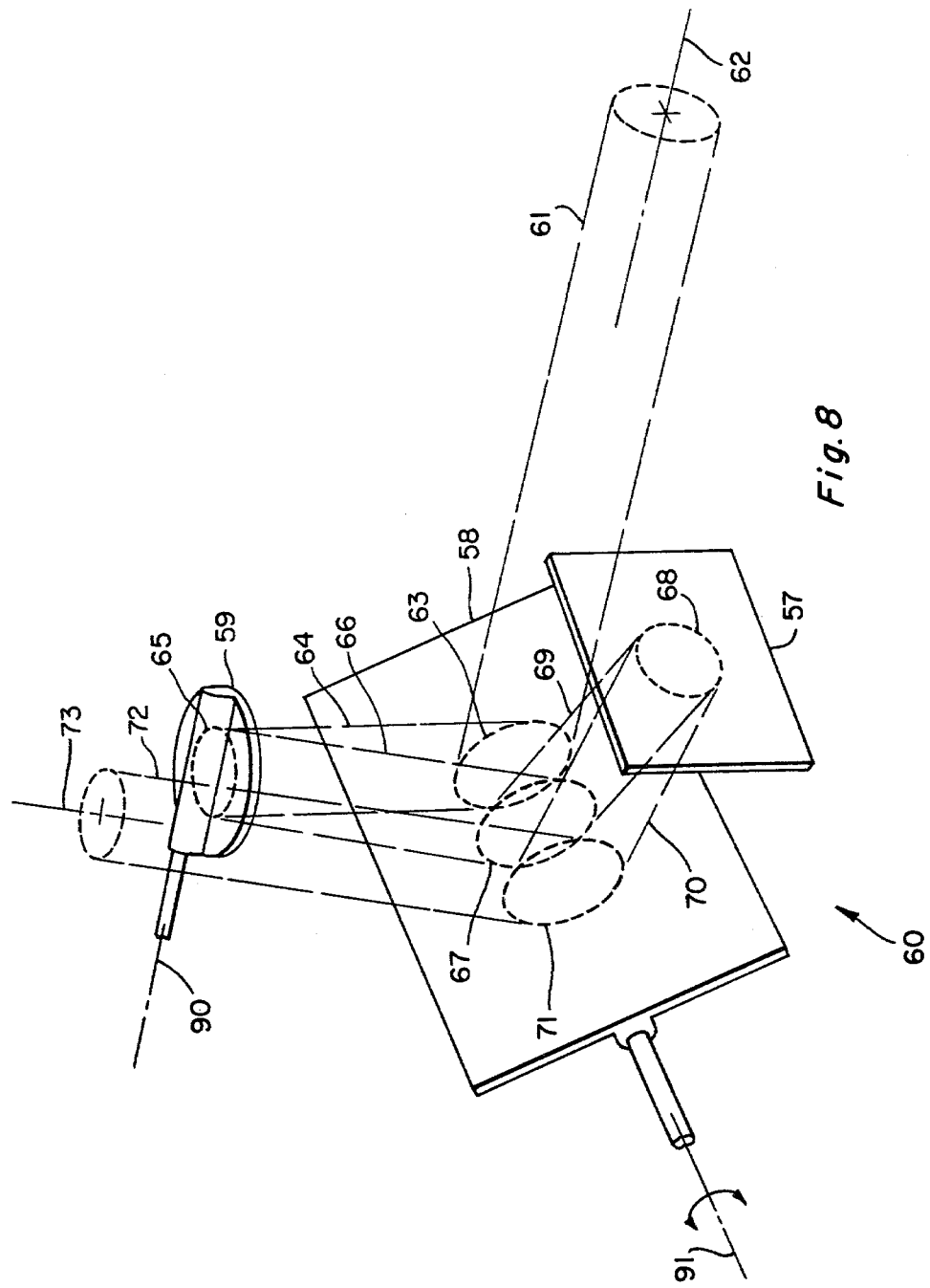
FIG. 8 shows another embodiment of the invention including three reflections on one of the reflectors.

FIG. 8 illustrates another reflector configuration that can be constructed according to this invention. A first optical bundle 61 travels along an axis 62 to the vertical-scan reflector 58 whereupon a footprint 63 is established. A radiant energy bundle 64 emanates from footprint 63, strikes horizontal-scan reflector 59, and establishes a footprint 66 thereon. The bundle then reflects from the footprint 65 and bundle 66 and impinges upon reflector 58 as footprint 67 where it is directed as bundle 69 to a stationary third reflector 57 thereby to establish footprint 68 thereon. A bundle 70 then emanates from the stationary reflector 57 where it strikes the horizontal-scan reflector 58 for the third time as indicated by footprint 71 at such an angle so that its reflected bundle 72 bypasses the horizontal scan reflector 59 along an axis 73 that may be ultimately directed to a detector or radiant energy source by methods previously described. This arrangement provides three reflections on the surface of the vertical-scan reflector 58 thereby to attain an even greater sweep angle in the vertical objective field for a given sweep angle of the reflector 58.

Figure 9:
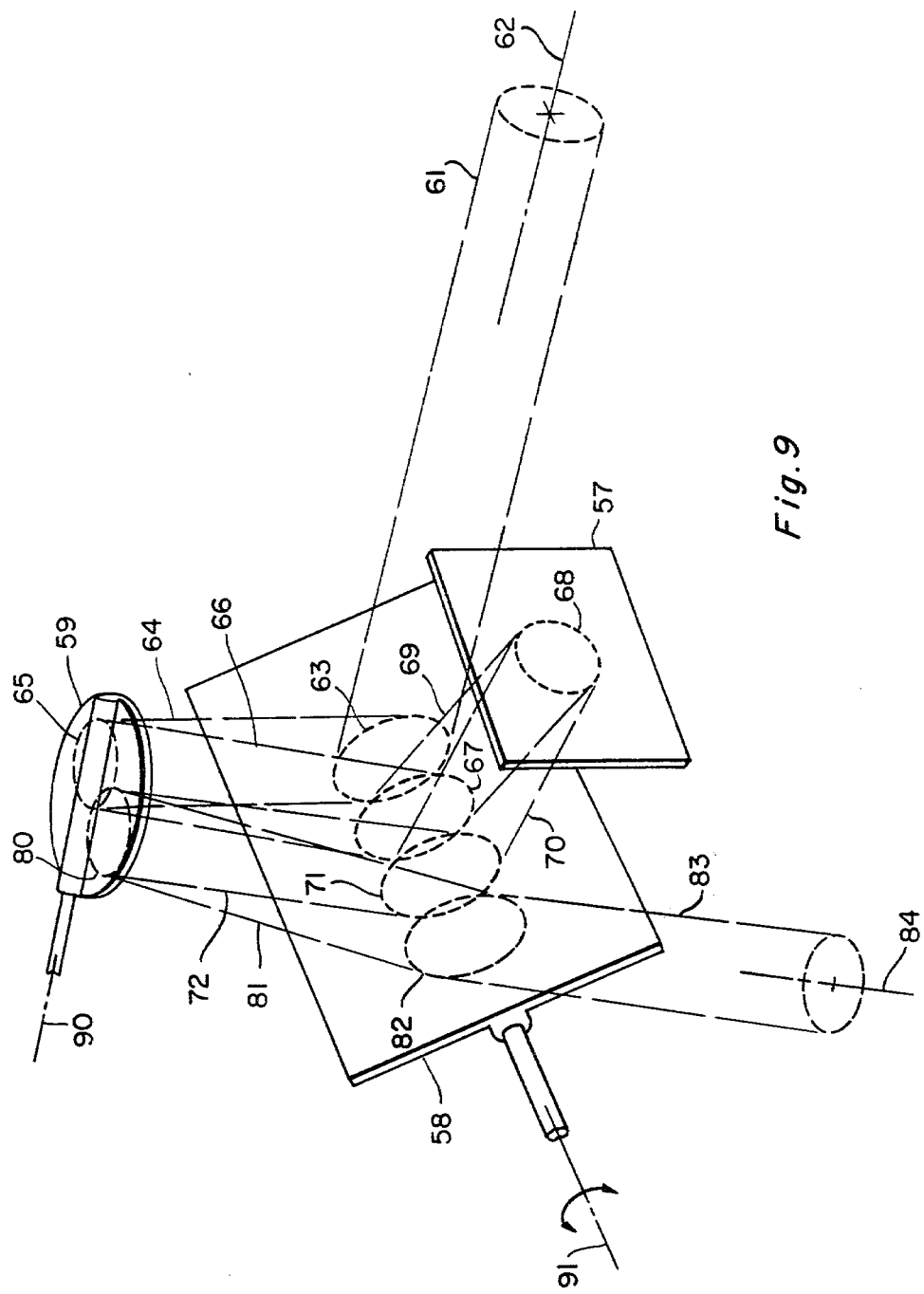
FIG. 9 shows yet another embodiment of the invention including multiple reflections on both horizontal and vertical scanning reflectors.

Likewise, multiple reflections can be made to simultaneously occur on the horizontal-scan and the vertical-scan reflectors. Such an arrangement is illustrated in FIG. 9. The paths and footprints of the radiant energy bundles of FIGS. 8 and 9 are similar for reference numerals 61 through 71. Multiple reflections can be achieved on the horizontal reflector 59 by reorientating the stationary reflector 57 so that the bundle 72 travels directly to the horizontal reflector 59 to establish a second footprint 80 thereon. Thus two reflections occur on the horizontal reflector 59 thereby to increase the effective angle of sweep in the horizontal objective field. A bundle 81 emanates from the footprint 80 and may pass directly to the detector on may again strike the horizontal-scan reflector 58 for the fourth time, as shown by footprint 82, whereupon a bundle 83 is directed free and clear of the stationary reflector 57 along an axis 84 to a detector or source, as the case may be. Again, a detector or radiant energy source and/or additional folding reflectors and lenses may be positioned to receive or focus the radiant energy bundle 83.

Thus, it is apparent that several variations of the invention can be constructed with the teachings of the illustrated embodiments. For example, the exact angular relationships among the reflectors, disposition of respective axes, location of optical paths 28 and 29, and position of the lens assembly can be altered and still achieve multiple reflections among the reflectors so that the axes of the radiant energy bundles between the reflectors lie in different planes for avoiding optical interference or obstruction of the reflectors. These variations can be made in both projecting and detecting systems. Therefore, the foregoing illustration and description do not define the limits of my invention.

What is claimed as new and desired to be secured by Letters Patent of the United States is:

1. An opto-mechanical scanning mechanism for use in an imaging system that scans an object field in two dimensions comprising:
   A. vertical-scan planar reflector means (21) positioned to receive radiant energy along a first optical path (28) from an object field and to reflect said radiant energy along a second optical path (27) different from said first optical path, B. vertical-scan drive means (45) for varying the angular position of said vertical-scan planar reflector means about a first axis (24) that is substantially orthogonal to said first optical path, C. horizontal-scan planar reflector means (22) positioned to receive said radiant energy reflected from said vertical-scan reflector means along said second optical path (20) and to reflect said radiant energy back onto said vertical-scan reflector means along a third optical path (38) different from said second optical path, said vertical-scan reflector means thereby reflecting said radiant energy along a fourth optical path (39) in a plane different from said first optical path, said fourth optical path leading to an image field, D. horizontal-scan drive means (46) for varying the angular position of said horizontal-scan planar reflector means about a second axis (25) that is substantially orthogonal to said second and third optical paths, said first, second and third optical paths being unobstructed, E. radiant energy detector means (30) for detecting radiant energy in said fourth optical path, and F. optical focusing means (35, 36, 37) for focusing elemental areas of said object field on said radiant energy detector means.

2. An opto-mechanical scanning mechanism as recited in claim 1 wherein said second axis (24) is substantially perpendicular to said first optical path (28) and said second axis (25) is substantially perpendicular to said second optical path (20) and third optical path (38).

3. An opto-mechanical scanning mechanism as recited in claim 2 wherein said radiant energy detector means comprises an infrared detector.

4. An opto-mechanical scanning mechanism as recited in claim 2 wherein said second axis (25) of said horizontal-scan drive means is substantially parallel to said first optical path and substantially orthogonal to said first axis (24) of said vertical-scan drive means.

5. An opto-mechanical scanning mechanism as recited in claim 2 wherein said radiant energy detector means (30) comprises dual focal point radiant energy detectors thereby to detect two horizontal lines in the object field for a single horizontal sweep of said horizontal-scan reflector means.

6. An opto-mechanical scanning mechanism as recited in claim 2 wherein said vertical-scan reflector means comprises a beryllium mirror having a low inertia when driven to pivot about said first axis in an oscillating fashion by said vertical-scan drive means at a rate that is the same as the vertical scan rate of a television display circuit, and said horizontal-scan reflector means comprises a beryllium mirror having a low inertia when driven to pivot about said second axis in an oscillating fashion at a rate that is a sub-multiple of the horizontal scan rate of a television display circuit, said horizontal-scan drive means comprising resonant torsional oscillator means and said vertical-scan drive means comprising means to linearly sweep the vertical-scan reflector in one vertical direction and to return said vertical-scan reflector to an initial sweep position.

7. An opto-mechanical scanning mechanism as recited in claim 2 wherein said vertical-scan reflector means comprises a low mass mirror having a low inertia when driven to pivot about said first axis in an oscillating fashion by said vertical-scan drive means at a rate that is the same as the vertical scan rate of a television display circuit, and said horizontal-scan reflector means comprises a low mass beryllium mirror having a low inertia when driven to pivot about said second axis in an oscillating fashion at a rate that is a sub-multiple of the horizontal scan rate of a television display circuit, said vertical-scan drive means and said horizontal-scan drive means comprising resonant torsional oscillator means.

8. An opto-mechanical scanning mechanism as recited in claim 2 wherein said vertical-scan reflector means comprises a low mass mirror having a low inertia when driven to pivot about said first axis in an oscillating fashion by said vertical-scan drive means at a rate that is the same as the vertical scan rate of a television display circuit, and said horizontal-scan reflector means comprises a low mass beryllium mirror adapted to be pivoted about said second axis in an oscillating fashion at a rate that is a sub-multiple of the horizontal scan rate of a television display circuit, said vertical-scan drive means and said horizontal-scan drive means comprising means to linearly sweep said vertical-scan and horizontal-scan reflectors in one direction of said respective vertical and horizontal directions, and to return each vertical-scan and horizontal-scan reflector to respective initial sweep positions.

9. An opto-mechanical scanning system as recited in claims 7 or 8 wherein said reflector means comprises a metallic beryllium mirrors having a low inertia when driven to pivot about their respective axes.

10. An opto-mechanical scanning mechanism as recited in claims 2, 4, or 6 wherein the surface area of said vertical-scan reflector means is reduced to the area traversed by the reflections thereon from said first and third optical paths in accordance with respective footprint mappings on said vertical-scan reflector means for the maximum angular displacement of said vertical-scan reflector means and said horizontal-scan reflector means.

11. An opto-mechanical scanning mechanism as recited in claim 2 wherein said horizontal-scan planar reflector means is nominally positioned between 40° and 60° with respect to the axis (28a) of said first optical path.

12. An opto-mechanical scanning mechanism as recited in claim 2 including a stationary reflector means (34) positioned to receive radiant energy from said fourth optical path (39) thereby to direct said radiant energy to said detector means.

13. An opto-mechanical scanning mechanism as recited in claim 2 including a third reflector means (57) that is positioned to direct said radiant energy in said fourth optical path (67) back onto the said vertical-scan reflector means (58) along a fifth optical path (70) thereby to establish a third reflection and corresponding third footprint (71) on said vertical-scan reflector means thereby to further increase the vertical sweep in the object field for a given vertical sweep of the vertical-scan reflector means, said radiant energy being reflected from the vertical-scan reflector means along a sixth optical path (72) to said radiant energy detector means.

14. An opto-mechanical scanning mechanism as recited in claim 2 including a third reflector means (57) that is positioned to direct said radiant energy in said fourth optical path (69) back onto said vertical-scan reflector means (58) along a fifth optical path (70) thereby to establish a third reflection (71) and a corresponding third footprint (71) on said vertical-scan reflector means, said radiant energy being reflected from said vertical-scan reflector means along a sixth optical path (72) that is directed to said horizontal-scan reflector means (59) thereby to establish a second reflection (80) and corresponding second footprint (80) on said horizontal-scan reflector means, said radiant energy being reflected from said horizontal-scan reflector means along a seventh optical path (81) to said radiant energy detector means.

15. A scanning reflector arrangement for transferring radiant energy between an object space and an image space comprising:
   A. vertical-scan reflector means (21) positioned to receive or project radiant energy along a first optical path (28) from or to an object space, and to transfer said radiant energy along a second optical path (20) different from said first optical path,
   B. vertical-scan drive means (45) for varying the angular position of said vertical-scan reflector means about a first axis (24) that is substantially orthogonal to said first optical path,
   C. horizontal-scan reflector means (22) positioned to receive said radiant energy reflected from said vertical-scan reflector means along said second optical path (20) and to reflect said radiant energy back onto said vertical-scan reflector means along a third optical path (38) different from said second optical path, said vertical-scan reflector means thereby reflecting said radiant energy along a fourth optical path in a plane different than said first optical path, said fourth optical path communicating with said image space, and
   D. horizontal-scan drive means (46) for varying the angular position of said horizontal-scan reflector means about a second axis (25) that is substantially orthogonal to said second and third optical paths, said first, second and third optical paths being unobstructed.

16. A scanning reflector arrangement as recited in claim 15 including means for focusing elemental areas from said object space in said image space.

17. A scanning reflector arrangement as recited in claim 15 wherein said second axis (25) is substantially parallel to said first optical path and substantially orthogonal to said first axis (24).

18. A scanning reflector arrangement as recited in claim 15 including a radiant energy source positioned in said fourth optical path, said radiant energy source being modulated in intensity according to the intensity levels of elemental areas of an image that is scanned vertically and horizontally, said vertical-scan drive means and horizontal-scan drive means being operative synchronously with the respective vertical and horizontal scanning of said image thereby to project said intensity modulated radiant energy source into said object space.

19. An opto-mechanical scanning mechanism as recited in claim 15 wherein said vertical-scan planar reflector means is nominally positioned between 40° and 60° with respect to the axis (28a) of said first optical path.

20. An opto-mechanical scanning mechanism as recited in claim 15 including a stationary reflector means (57) positioned to receive radiant energy from said fourth optical path (39) thereby to direct said radiant energy to said detector means.

21. An opto-mechanical scanning mechanism as recited in claim 20 wherein said third reflector means is positioned to direct said radiant energy in said fourth optical path back onto the said vertical-scan reflector means along a fifth optical path thereby to establish a third reflection and corresponding footprint on said vertical-scan reflector means to further increase the vertical sweep in the object field for a given vertical sweep of the vertical-scan reflector means, said radiant energy being reflected from the vertical-scan reflector means along a sixth optical path to said radiant energy detector means.

22. An opto-mechanical scanning mechanism as recited in claim 20 wherein said third reflector means is positioned to direct said radiant energy in said fourth optical path back onto said vertical-scan reflector means along a fifth optical path thereby to establish a third reflection and a corresponding footprint on said vertical-scan reflector means, said radiant energy being reflected from said vertical-scan reflector means along a sixth optical path that is directed to said horizontal-scan reflector means thereby to establish a second reflection and corresponding second footprint on said horizontal-scan reflector means, said radiant energy being reflected from said horizontal-scan reflector means along a seventh optical path to said radiant energy detector means.

* * * * *